(12) United States Patent
Afeiche et al.

(10) Patent No.: US 6,524,373 B2
(45) Date of Patent: Feb. 25, 2003

(54) TWO-STAGE WATER EXTRACTOR

(75) Inventors: George N. Afeiche, Torrance, CA (US); Michael B. Faust, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/832,082

(22) Filed: Apr. 9, 2001

(65) Prior Publication Data

US 2002/0144599 A1 Oct. 10, 2002

Related U.S. Application Data

(60) Provisional application No. 60/221,675, filed on Jul. 28, 2000.

(51) Int. Cl.[7] .............................................. B01D 45/12
(52) U.S. Cl. ............................. 95/269; 55/396; 55/423; 55/457; 55/466
(58) Field of Search ............................ 95/269; 55/394, 55/396, 423, 457, 466

(56) References Cited

U.S. PATENT DOCUMENTS

| | | | |
|---|---|---|---|
| 2,662,610 A | * 12/1953 | Heinrich | 55/347 |
| 3,633,342 A | * 1/1972 | Richardson | 261/116 |
| 4,349,360 A | 9/1982 | Schuurmans et al. | |
| 4,437,318 A | 3/1984 | Werjefelt | |
| 4,602,925 A | * 7/1986 | Huffman | 55/457 |
| 4,629,481 A | * 12/1986 | Echols | 122/34 |
| 4,654,061 A | 3/1987 | Jung | |
| 4,681,610 A | 7/1987 | Warner | |
| 4,769,050 A | 9/1988 | Shaw et al. | |
| 5,299,763 A | 4/1994 | Bescoby et al. | |
| 5,857,344 A | 1/1999 | Rosenthal | |
| 5,885,333 A | 3/1999 | Dix | |
| 5,906,111 A | 5/1999 | Lui | |
| 5,972,171 A | 10/1999 | Ross et al. | |

FOREIGN PATENT DOCUMENTS

| | | |
|---|---|---|
| JP | 09292120 | 11/1997 |
| WO | WO 99/59867 | 11/1999 |

* cited by examiner

Primary Examiner—Robert A. Hopkins
(74) Attorney, Agent, or Firm—William J. Zak, Jr., Esq.

(57) ABSTRACT

A method and apparatus for extracting water droplets from a water-laden airstream includes introducing the airstream into an extractor duct, imparting a swirling motion to the airstream at a first axial location in the duct, removing water droplets from the airstream that have been thrown to the inner surface of the duct at a second axial location downstream of the first location, and at a third axial location downstream of the second location removing water droplets not removed at the second location. The water removal mechanism at the second location includes a first collection chamber and a first array of apertures circumferentially positioned about the duct and communicating the interior of the duct with the first collection chamber. The water removal mechanism at the third location includes a second collection chamber and an upstream-facing annular ring of smaller diameter than the diameter of the duct for capturing water droplets that have not been collected by the water removal mechanism at the second location.

32 Claims, 2 Drawing Sheets

TWO-STAGE WATER EXTRACTOR

CROSS-REFERENCE TO RELATED APPLICATIONS

This application claims the benefit of U.S. Provisional patent application No. 60/221,675 filed Jul. 28, 2000.

BACKGROUND OF THE INVENTION

The present invention relates to water extractors and, more particularly, to a water extractor that incorporates an upstream air-water droplet swirl-imparting mechanism with a plurality of downstream water droplet collection zones for capturing water droplets.

Water extractors are generally used for removing water droplets from an airstream. Such devices are typically used in an environmental control system (ECS) which supplies cool dry air to the cabin or passenger compartment of an aircraft. Generally, humid air for this purpose is obtained in a heated condition from the engines or the auxiliary power unit of the aircraft. As the humid air cools, as for example after being passed through a condenser, water vapor condenses into liquid. It is highly desirable that the water liquid droplets be removed from the air stream before the air is routed to the cabin or passenger compartment, because unless the moisture is removed, the water liquid droplets will reduce the efficiency of the system, cause icing problems when the air is at subfreezing temperatures, cause fog in the aircraft ducts, cabin and flight deck, and corrode system components.

Various prior art water extractors have been used in removing water from moisture-laden air. Exemplary of such devices are those shown in U.S. Pat. No. 4,681,610 to Warner and U.S. Pat. No. 5,885,333 to Dix. Both of these patents disclose high performance water collectors. However, the shape and size of these water extractors, as well as their installation requirements, do not lend themselves to the current needs of aircraft environmental control systems because, as a rule, existing designs for water vapor extractors require a minimum length, based on a typical length to diameter ratio, that exceeds the available installation space for newer aircraft air-conditioning systems or environmental control systems. This dimensional constraint leads to a substantial deficiency in the water removal performance which, in turn, results in diminished cooling performance otherwise required to meet the output needs for the aircraft cabin application.

Therefore, there exists a need for an apparatus and method for providing a water extractor that can attain an optimum flow rate within the physical constraints of a small space available for installation.

SUMMARY OF THE INVENTION

In one aspect of the present invention, a water extractor comprises a housing through which moisture-laden air flows where the housing includes a swirl-imparting member at an entrance to the housing, and two water extracting assemblies axially spaced from one another and located downstream from the swirl-imparting member.

In another aspect of the present invention, a method of treating a water-laden air stream to remove water droplets therefrom comprises imparting a swirling, centrifugal motion to the air stream at a first station near the entrance of a water extractor housing; and then removing water droplets from the air stream at two additional, axially separated, stations in the water extractor housing downstream from the first station. One of the two stations includes an axially extensive perforated section of the housing wall, and the other of the two stations includes an upstream-facing flange of smaller diameter than that of the housing for removing water droplets not captured at the first station.

Other aspects, advantages and features of the invention will become more apparent and better understood, as will equivalent structures which are intended to be covered herein, with the teaching of the principles of the invention in connection with the disclosure of the preferred embodiments thereof in the specification, claims and drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a water extractor of superior design and performance.

In general, the present invention is an apparatus that functions to remove water droplets from a gas stream, such as, and in particular, from a stream of air. Typically, the air is in an aircraft environmental control system (ECS).

Figure 1:
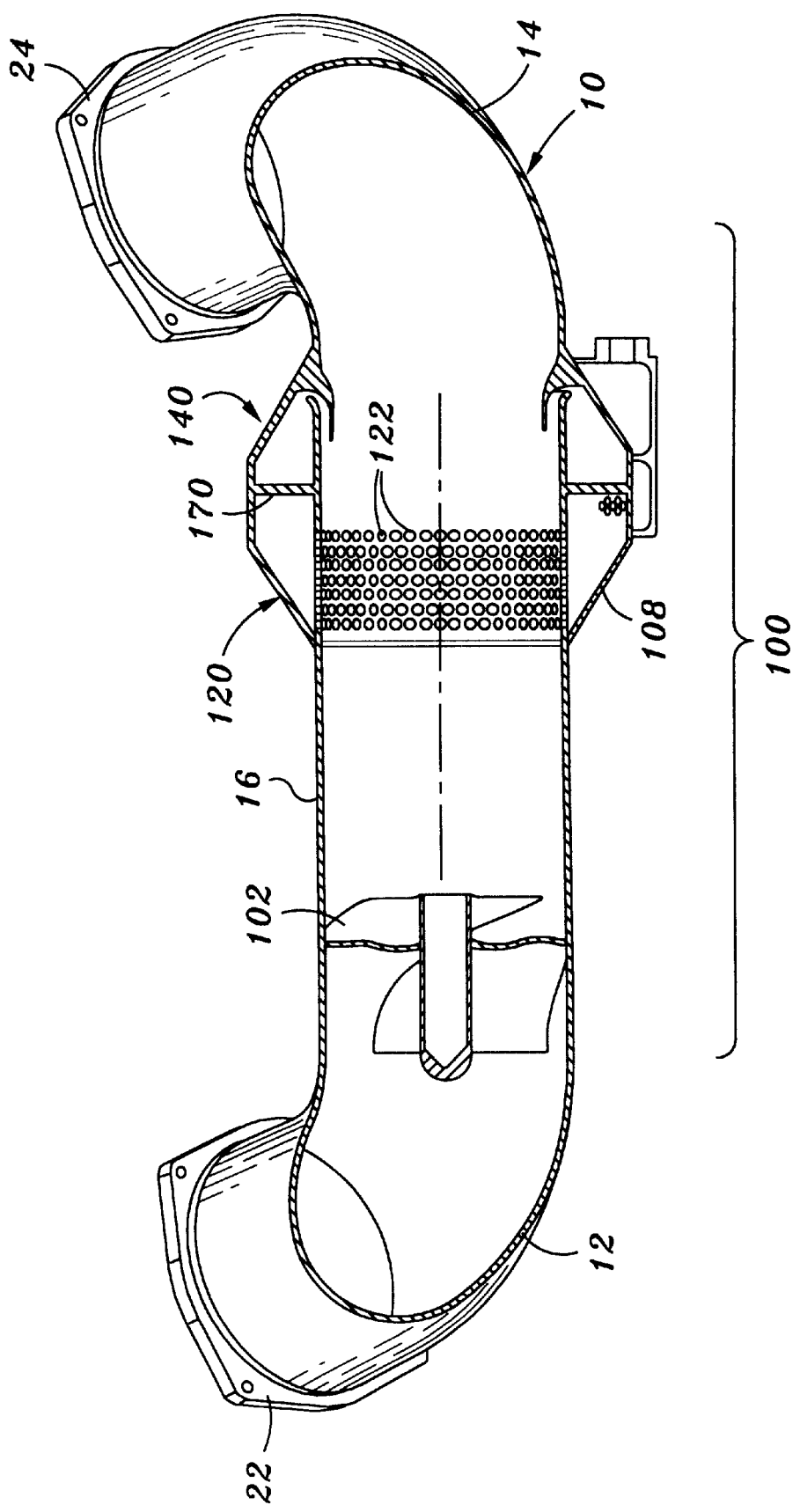
FIG. 1 is a partially sectional view of the water extractor assembly and duct for housing the water extractor assembly of the present invention.

Referring first to FIG. 1, there is shown a substantially cylindrical housing or duct 10 which incorporates the water extractor assembly 100 of the present invention. The housing includes an inlet end portion 12, an outlet end portion 14, and a central portion 16 in which the water extractor assembly is housed. The free end of each of the inlet end portion 12 and the outlet portion 14 is provided with a mounting flange 22, 24, respectively, for mounting the housing 10 to the ECS of the aircraft.

Figure 2:
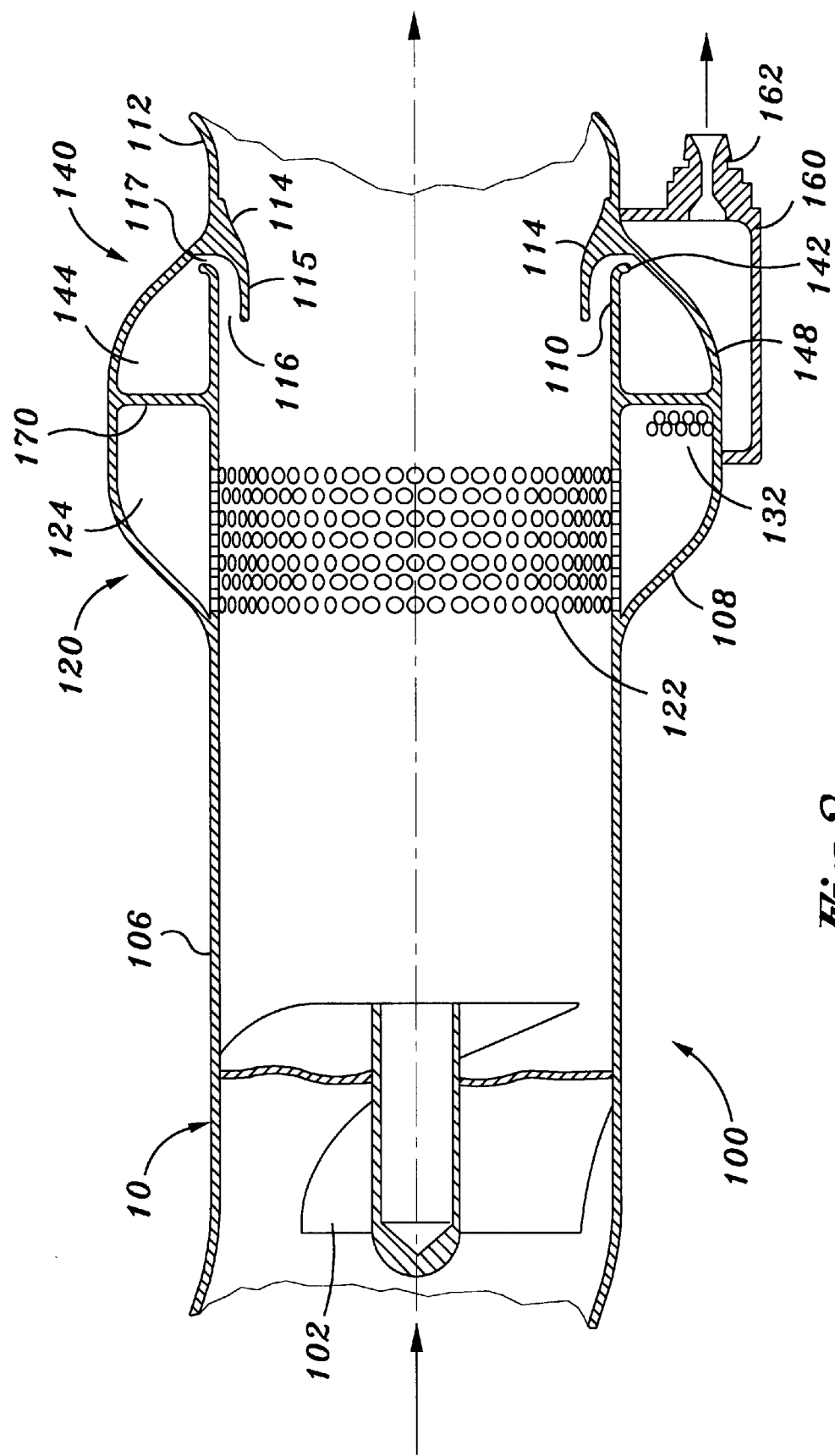
FIG. 2 is a partial cross-sectional view of the water extractor assembly according to a preferred embodiment of the present invention.

Referring further to FIG. 2, the duct 10, of which the water extractor assembly 100 is a part, constitutes a length of cylindrical pipe, and is seen to include a swirl imparting member or static swirl vane 102 at a first station located at a first axial location in the vicinity of the entrance to the duct 10. The static swirl vane 102 is provided for imparting a centrifugal motion to an air/water droplet stream P entering the housing 10 at the inlet end portion 12. As the air/water droplet stream P impacts the swirl vane 102, it begins a swirling motion in the housing 10. The result is that the heavier components of the air/water droplet stream P, that is the water droplets, are flung radially toward the inner surface of the wall 106 of the duct 10 through which the air/water droplet stream traverses.

Downstream of the first station is a second station at which two assemblies for removing water droplets are located. At this second station, a sleeve 108 of greater radius than the duct wall 106 is secured by welding or brazing about the outside of the duct wall 106, and a panel or bulkhead 170 extends radially between the outer surface of the duct wall 106 and the inner surface of the sleeve 108 to divide the volume between the sleeve 108 and the duct wall 106 into two chambers 124 and 144 (to be described further below). The downstream end 110 of the duct wall 106 terminates short of the downstream end 112 of the sleeve 108. An annular collar 114, secured to the radially inside surface of the sleeve 108 downstream of the duct end 110, has an upstream-facing free end portion 115 which has a smaller radius than the radius of the duct wall 106. A gap 116 is formed between the downstream end 110 of the duct wall 106 and the radially outer surface of the upstream facing annular collar 114. The gap 116 communicates the interior of the chamber 144 with the interior of the duct 10.

The water droplets which have been thrown radially to the inside surface of the duct wall 106 by the swirl vane 102 are then collected downstream of the swirl vane 102 using the two diverse water collection assemblies at the second station and, specifically, at a second axial location and a third axial location, respectively. The first water collection assembly is shown at 120 in FIG. 2, and the second water collection assembly is shown at 140. The present invention contemplates that these two collections assemblies could be reversed, that is the second water collection assembly 140 could be positioned closer to the swirl vane 102 than the first water collection assembly 120. However, the arrangement of collection assemblies shown in FIG. 2 will be used for purposes of this description.

The first collection assembly 120 includes an array 122 of small diameter, equidistantly spaced openings or holes arranged over an axial extent and about the circumference of the duct wall 106 and a first water collection chamber 124. The array 122 comprises a plurality of rings of openings, with each of the rings of openings being circumferentially offset from the adjacent ring of openings. All of the rings of openings are arranged such that no ring is located axially outside of the first collection chamber 124.

The holes permit the water droplets that have been directed toward the duct wall 106 by the swirling action of the air/water droplet stream to be removed from the duct 10 and deposited in the first collection chamber 124. Preferably, the holes are about 0.25" in diameter and are arranged in the array 122 in a plurality of rows and in a manner where the holes in one row are circumferentially offset relative to the holes in the next row. More preferably, the size of the holes is selected to allow facile passage of the water droplets through the duct wall 106 into the collection chamber 124. Still more preferably, the percentage of open area defined by the holes in the array 122 should be approximately 30% to 60%, so as to minimize turbulent air from entering the chamber 124 while preventing the water droplets that have entered the chamber 124 from escaping back into the main air stream.

The bulkhead 170 is located at, and defines, the downstream end of the collection chamber 124. The second water collection assembly 140 includes a second collection chamber 144 located on the downstream side of the first collection chamber 124 and is defined between the inner surface of the sleeve 108, the outer surface of the duct wall 106, and the bulkhead 170. In order to provide an adequate collection volume in the first collection chamber 124, it is important that the distance between the last downstream row of holes in the array 122 and the axial location of the bulkhead 170 be of a substantial amount, preferably on the order of about 0.5 to 1.5 inches. This distance also prevents water from exiting the collection chamber 124 and returning to the main air stream. The distance between the last downstream row of holes in the array 122 and the axial location of the bulkhead 170 will vary based on the orientation of the unit with respect to gravity.

The second collection chamber 144 is characterized by the termination of the duct end 110 at an axial location downstream of the bulkhead 170 in a radially outwardly turned lip 142 adjacent the sleeve 114, which defines therebetween the gap 116, all of which are a part of the second water collection assembly 140. Water droplets which do not enter the first collection chamber 124 enter the gap 116 and are drawn and then swept into the second collection chamber 144. The annular volume of the second collection chamber 144, therefore, is open at the downstream end of the chamber 144, so that water droplets that still remain on the inside surface of the duct wall 106, or are in the process of migrating to the inside surface of the duct wall 106, downstream of the first collection chamber 124 are drawn or directed into the second collection chamber 144. The radial "width" of the gap 116 is preferably approximately 5% to 7% of the duct 10 diameter, to a minimum of about 0.25 inches. Thus, for a six-inch diameter duct 10, the width of the gap 116 is approximately 0.38 inches. In the upstream end of the second collection chamber 144 adjacent the bulkhead 170 are approximately three 0.25 inch diameter holes 148 in the sleeve 108 wall.

The three 0.25 inch holes 148 define a flow path out of the second collection chamber 144 for water collected there and into a third or sump collection chamber 160 located radially outside of the first and second collection chambers 124, 144. Water droplets collected in the third collection chamber 160 are drained through a port 162 located preferably downstream of the first and second colection chambers. The port 162 is located at a low point with respect to gravity of the third collection chamber 160 which allows for water to settle in the chamber and to be removed from the water extractor 10. Typically, the removed water is used as a spray to enhance cooling of the ECS.

The first collection chamber 124 captures the bulk (i.e., about 75% to 85%) of the water droplets and is provided with a second array of apertures 132 arranged axially between the first array 122 and the bulkhead 170 to facilitate emptying of the first collection chamber 124 into the third collection chamber 160. The second collection chamber 144 operates at a slightly elevated pressure than the first chamber due to its upstream-facing annular capture geometry. The circumferential slot 117 at the downstream end of the annular slot 116 guides the extracted water into the chamber 144. The advantage of this geometry is that the water more easily enters the chamber 144 since the entry point is at the downstream end of the chamber. The aerodynamic resistance to the water entering the chamber 144 is reduced compared to an entry at the upstream end of the chamber. The width of the slot 117 should be preferably on the order of about 0.10 to 0.25 inches to maximize water removal. A larger slot 117 tends to reduce the amount of water captured by the second chamber 144 because, when greater than 0.25 inch, turbulence occurs which interferes with water capture.

The geometry of the second collection zone has an effect on the water removal performance of the first collection chamber 124. The aerodynamic blockage caused by the small diameter of annular collar 114 relative to the duct wall 106 reduces the pitch of the spiral pattern of the water vapor stream leaving the swirl vane assembly 102 and contacting the duct wall 106. This then increases the opportunity for the swirling water droplets to come into contact with the holes 122 in the duct wall 106 and enter the first collection chamber 124. A too small diameter of the annular collar 114 reduces the amount of water captured in the first collection chamber 124 because the increased air velocity needed to go through the reduced flow area pulls water off the duct wall 106 before it can be captured by the array of holes 122 associated with the first collection chamber 124. If the diameter of the annular collar 114 is too large, there is also a reduction in water collection in both the first collection chamber 124 and the second collection chamber 144.

In the foregoing specification, the invention has been described with reference to one or more specific embodiments. However, one of ordinary skill in the art appreciates that various modifications and changes can be made without departing from the scope of the present invention as set forth in the claims below. For example, it is to be understood that the number of extractor zones need not be limited to two, and it is further to be understood that the water extracting mechanism(s) at each zone can be comprised of any one, two or more of the circumferential band of apertures, such as those shown in the array 122 of apertures, along with the first collection chamber 124, and/or the annular collar 114, gap 117 and second collection chamber 144.

We claim:

1. A water extractor assembly, comprising:
    a duct having an upstream end portion for receiving an air and water droplet stream and a downstream end portion,
    a swirl imparting member, at a first station of said duct, for imparting a swirling motion to the air and water droplet stream entering said duct,
    a first water collection assembly consisting of at least one of the group including either a circumferential band of perforations or an upstream facing annular collar of smaller diameter than the diameter of said duct, at a second station downstream of said first station location, for collecting water droplets that have been thrown to the inner surface of said duct; and
    a second water collection assembly consisting of at least a different one of the group including either a circumferential band of perforations or an upstream facing annular collar of smaller diameter than the diameter of said duct, said second water collection assembly being located at said second station, for collecting water droplets not collected by said first water collection assembly.

2. The water extractor assembly of claim 1, further comprising a sump collection chamber in communication with said first and second water collection assemblies.

3. The water extractor assembly of claim 2, wherein said sump collection chamber is disposed radially about said first and second water collection assemblies.

4. The water extractor assembly of claim 1, wherein said first water collection assembly comprises said circumferential band of perforations and a first collection chamber disposed radially outside of said duct and communicating with said circumferential band of perforations.

5. The water extractor assembly of claim 4, wherein said circumferential band of perforations comprises equidistantly spaced openings disposed about said duct at said second station such that the openings form a ring about said duct at said second station within an axial extent of said first collection chamber.

6. The water extractor of claim 5, wherein said circumferential band of perforations comprise a plurality of rings of openings, each of said rings of openings being circumferentially offset from the adjacent ring of openings.

7. The water extractor of claim 6, wherein all of said rings of openings are arranged such that no ring is located axially outside of said first collection chamber.

8. The water extractor of claim 4, wherein said first collection assembly further comprises an array of openings arranged radially outwardly of said circumferential band of perforations, said array of openings being located axially downstream of said circumferential band of perforations.

9. The water extractor of claim 1, wherein said second water collection assembly comprises a second collection chamber having a gap in communication with an interior of said duct.

10. A method of extracting water droplets from a water-laden airstream, comprising:
    introducing said airstream into a duct,
    imparting, at a first axial location in said duct, a swirling motion to said airstream,
    removing, through at least one of a first array of apertures disposed in an annular arrangement about the duct or an upstream facing collar of a diameter smaller than the diameter of the duct at a second axial location downstream of said first axial location, water droplets from said airstream that have migrated to an inner surface of said duct, and
    removing, at a third axial location downstream of said second axial location through at least the other of the first array of apertures or the upstream facing collar, water droplets from said airstream that were not removed at said second axial location.

11. The method of claim 10, wherein the step of removing water droplets at said second axial location comprises moving said water droplets through said first array of apertures in said inner surface and into a first collection chamber.

12. The method of claim 11, further comprising moving said water droplets from said first collection chamber and into a sump collection chamber.

13. The method of claim 10, wherein removing water droplets at said third axial location comprises moving said water droplets through a gap of a second collection chamber that is in communication with an interior of said duct.

14. The method of claim 13, further comprising moving said water droplets from said second collection chamber and into a sump collection chamber.

15. A water extractor assembly, comprising:
    a duct having an upstream end portion for receiving an air and water droplet stream and a downstream end portion,
    a swirl imparting member, at a first station of said duct, for imparting a swirling motion to the air and water droplet stream entering said duct,
    a first water collection assembly comprising a circumferential band of perforations, at a second station downstream of said first station location, for collecting water droplets that have been thrown to the inner surface of said duct; and
    a second water collection assembly comprising an upstream facing annular collar of smaller diameter than the diameter of said duct, said second water collection assembly being located at said second station, for collecting water droplets not collected by said first water collection assembly.

16. The water extractor assembly of claim 1, further comprising a sump collection chamber in communication with said first and second water collection assemblies.

17. The water extractor assembly of claim 16, wherein said sump collection chamber is disposed radially about said first and second water collection assemblies.

18. The water extractor assembly of claim 15, wherein said first water collection assembly further comprises a first collection chamber disposed radially outside of said duct and communicating with said circumferential band of perforations.

19. The water extractor assembly of claim 18, wherein said circumferential band of perforations comprises equidistantly spaced openings disposed about said duct at said second station such that the openings form a ring about said duct at said second station within an axial extent of said first collection chamber.

20. The water extractor of claim 19, wherein said circumferential band of perforations comprise a plurality of rings of openings, each of said rings of openings being circumferentially offset from the adjacent ring of openings.

21. The water extractor of claim 20, wherein all of said rings of openings are arranged such that no ring is located axially outside of said first collection chamber.

22. The water extractor of claim 18, wherein said first collection assembly further comprises an array of openings arranged radially outwardly of said circumferential band of perforations, said array of openings being located axially downstream of said circumferential band of perforations.

23. The water extractor of claim 15, wherein said second water collection assembly comprises a second collection chamber having a gap in communication with an interior of said duct.

24. A water extractor assembly, comprising:
   a duct having an upstream end portion for receiving an air and water droplet stream and a downstream end portion,
   a swirl imparting member, at a first station of said duct, for imparting a swirling motion to the air and water droplet stream entering said duct,
   a first water collection assembly comprising an upstream facing annular collar of smaller diameter than the diameter of said duct, at a second station downstream of said first station location, for collecting water droplets that have been thrown to the inner surface of said duct; and
   a second water collection assembly comprising a circumferential band of perforations, said second water collection assembly being located at said second station, for collecting water droplets not collected by said first water collection assembly.

25. The water extractor assembly of claim 24, further comprising a sump collection chamber in communication with said first and second water collection assemblies.

26. The water extractor assembly of claim 25, wherein said sump collection chamber is disposed radially about said first and second water collection assemblies.

27. The water extractor of claim 24, wherein said first water collection assembly comprises a first collection chamber having a gap in communication with an interior of said duct.

28. The water extractor assembly of claim 24, wherein said second water collection assembly comprises a second collection chamber disposed radially outside of said duct and communicating with said circumferential band of perforations.

29. The water extractor assembly of claim 28, wherein said circumferential band of perforations comprises equidistantly spaced openings disposed about said duct at said second station such that the openings form a ring about said duct at said second station within an axial extent of said second collection chamber.

30. The water extractor of claim 29, wherein said circumferential band of perforations comprise a plurality of rings of openings, each of said rings of openings being circumferentially offset from the adjacent ring of openings.

31. The water extractor of claim 30, wherein all of said rings of openings are arranged such that no ring is located axially outside of said second collection chamber.

32. The water extractor of claim 28, wherein said second collection assembly further comprises an array of openings arranged radially outwardly of said circumferential band of perforations, said array of openings being located axially downstream of said circumferential band of perforations.

* * * * *